(12) United States Patent
Nomachi et al.

(10) Patent No.: US 9,112,987 B2
(45) Date of Patent: Aug. 18, 2015

(54) MOBILE ELECTRONIC DEVICE AND DISPLAY CONTROLLING METHOD

(75) Inventors: Nayu Nomachi, Yokohama (JP); Takayuki Sato, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 192 days.

(21) Appl. No.: 13/515,550

(22) PCT Filed: Dec. 13, 2010

(86) PCT No.: PCT/JP2010/072405
§ 371 (c)(1),
(2), (4) Date: Jun. 13, 2012

(87) PCT Pub. No.: WO2011/074548
PCT Pub. Date: Jun. 23, 2011

(65) Prior Publication Data
US 2012/0264487 A1 Oct. 18, 2012

(30) Foreign Application Priority Data

Dec. 15, 2009 (JP) ................................ 2009-283723
Jan. 12, 2010 (JP) ................................ 2010-003651

(51) Int. Cl.
H04M 1/725 (2006.01)
G06F 3/0482 (2013.01)
G06F 3/0488 (2013.01)
G10L 15/26 (2006.01)

(52) U.S. Cl.
CPC ......... H04M 1/72544 (2013.01); G06F 3/0482 (2013.01); G06F 3/04886 (2013.01); G06F 2200/1637 (2013.01); G10L 15/26 (2013.01); H04M 2250/12 (2013.01)

(58) Field of Classification Search
USPC .......... 455/563, 566; 715/835, 840, 702, 705, 715/790, 793, 830, 838; 345/619; 704/E15.001
See application file for complete search history.

(56) References Cited

U.S. PATENT DOCUMENTS

| | | | |
|---|---|---|---|
| 5,422,993 A * | 6/1995 | Fleming ........................ | 715/835 |
| 7,296,242 B2 * | 11/2007 | Agata et al. ................... | 715/793 |
| 7,509,588 B2 * | 3/2009 | Van Os et al. ................. | 715/835 |
| 8,191,011 B2 * | 5/2012 | Abanami et al. .............. | 715/835 |
| 8,207,986 B2 * | 6/2012 | Nakamura et al. ............ | 345/619 |
| 2002/0054158 A1 * | 5/2002 | Asami .......................... | 345/838 |

(Continued)

FOREIGN PATENT DOCUMENTS

| JP | 2001222355 A | 8/2001 |
|---|---|---|
| JP | 2004021522 A | 1/2004 |

(Continued)

OTHER PUBLICATIONS

International Search Report and Written Opinion for PCT/JP20101072405, dated Mar. 15, 2011.

*Primary Examiner* — Junpeng Chen
(74) *Attorney, Agent, or Firm* — Lowe Hauptman & Ham, LLP

(57) ABSTRACT

According to an aspect, a mobile electronic device, includes a display unit, a detection unit, and a display control unit. The display unit displays a standard screen on which objects are superimposed. The detection unit detects occurrence of a predetermined event. The display control unit changes arrangement of the objects displayed on the display unit in accordance with the predetermined event detected by the detection unit.

10 Claims, 14 Drawing Sheets

(56) References Cited

U.S. PATENT DOCUMENTS

| | | |
|---|---|---|
| 2005/0026657 A1 | 2/2005 | Hasegawa et al. |
| 2009/0178008 A1* | 7/2009 | Herz et al. .................. 715/840 |
| 2009/0199134 A1* | 8/2009 | Murayama .................. 715/835 |
| 2010/0241955 A1* | 9/2010 | Price et al. .................. 715/702 |

FOREIGN PATENT DOCUMENTS

| | | |
|---|---|---|
| JP | 2005051316 A | 2/2005 |
| JP | 2006244326 A | 9/2006 |

\* cited by examiner (a)  (b)  (c)

(d)  (e)

(a)  (b)

(c)

(a)  (b)  (c)

(d)  (e)

MOBILE ELECTRONIC DEVICE AND DISPLAY CONTROLLING METHOD

CROSS-REFERENCE TO RELATED APPLICATION

This application is a National Stage of PCT international application Ser. No. PCT/JP2010/072405 filed on Dec. 13, 2010 which designates the United States, and which is based upon and claims the benefit of priority from Japanese Patent Application No. 2009-283723, filed on Dec. 15, 2009, and Japanese Patent Application No. 2010-003651, filed on Jan. 12, 2010.

FIELD

The present disclosure relates to a mobile electronic device including a display unit and a display controlling method for the mobile electronic device.

BACKGROUND

A mobile phone being an example of a mobile electronic device displays a standard screen (a screen during non-calling to be displayed when the mobile phone is powered-up; also called wallpaper, desktop, and a standby screen) on a display unit, for example. Some mobile phones display objects such as tags on which characters are described on the standard screen in a superposed (pasted) manner (see Patent Literature 1).

CITATION LIST

Patent Literature

Patent Literature 1: Japanese Patent Application Laid-Open No. 2005-51316

Technical Problem

When a plurality of tags is pasted to the standard screen for display as a plurality of objects, it is difficult for a user to discriminate the plurality of displayed tags. For example, it is particularly difficult in a case that a plurality of tags having similar characters exists. Accordingly, it takes time to perform extracting when a user desires to extract a desired tag.

For the foregoing reasons, there is a need for helping a user rapidly extract an object among a plurality of objects displayed on the screen.

SUMMARY

According to an aspect, a mobile electronic device includes: a display unit for displaying a standard screen on which objects are superimposed; a detection unit for detecting occurrence of a predetermined event; and a display control unit for changing arrangement of the objects displayed on the display unit in accordance with the predetermined event detected by the detection unit.

According to another aspect, the display control unit moves a non-corresponding object on the standard screen other than a corresponding object which corresponds to the predetermined event among the objects displayed on the display unit based on the predetermined event when the detection unit detects occurrence of the predetermined event.

According to another aspect, the display control unit shifts a display state of the objects in accordance with the predetermined event detected by the detection unit to any of a first display state in which the objects are displayed in an aligned manner, a second display state in which the objects are not displayed in an aligned manner, and a third display state in which a part of objects among the objects is displayed in an aligned manner and other objects are not displayed in an aligned manner.

According to another aspect, a display controlling method for a mobile electronic device having a display unit includes: displaying a standard screen on which objects are superimposed on the display unit; detecting occurrence of a predetermined event; and changing arrangement of the objects displayed on the display unit in accordance with the detected predetermined event.

Advantageous Effects of Invention

According to the present invention, it becomes possible for a user to rapidly extract an object which is appropriate to a usage situation among a plurality of objects displayed on the standard screen.

DESCRIPTION OF EMBODIMENTS

In the following, embodiments of a mobile electronic device and a display controlling method according to the present invention will be described with a plurality of examples with reference to the drawings. In the following description of the respective embodiments, the same reference sign may be given to a similar unit and description thereof may not be repeated.

Configuration of a Mobile Phone According to a First Embodiment

Figure 1A:
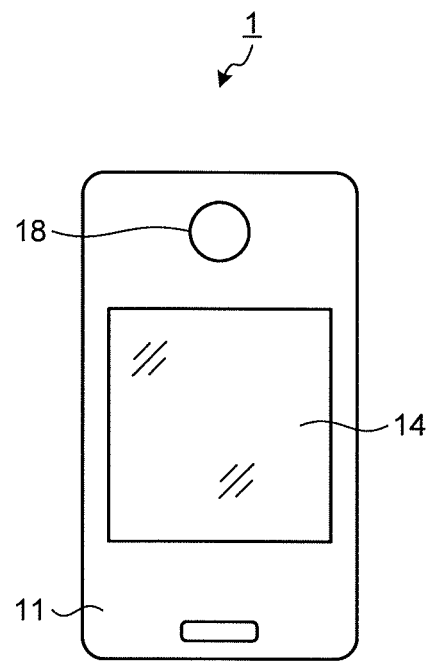
FIG. 1A is a view illustrating an example of an external appearance of a mobile phone in a closed state according to a first embodiment.
Figure 1B:
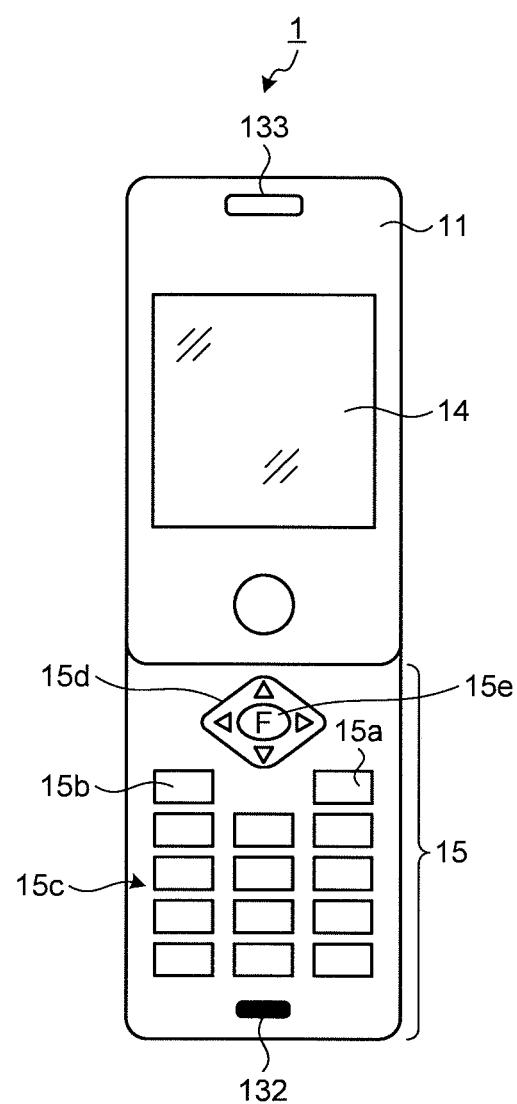
FIG. 1B is a view illustrating an example of an external appearance of the mobile phone in an opened state according to the first embodiment.
Figure 2:
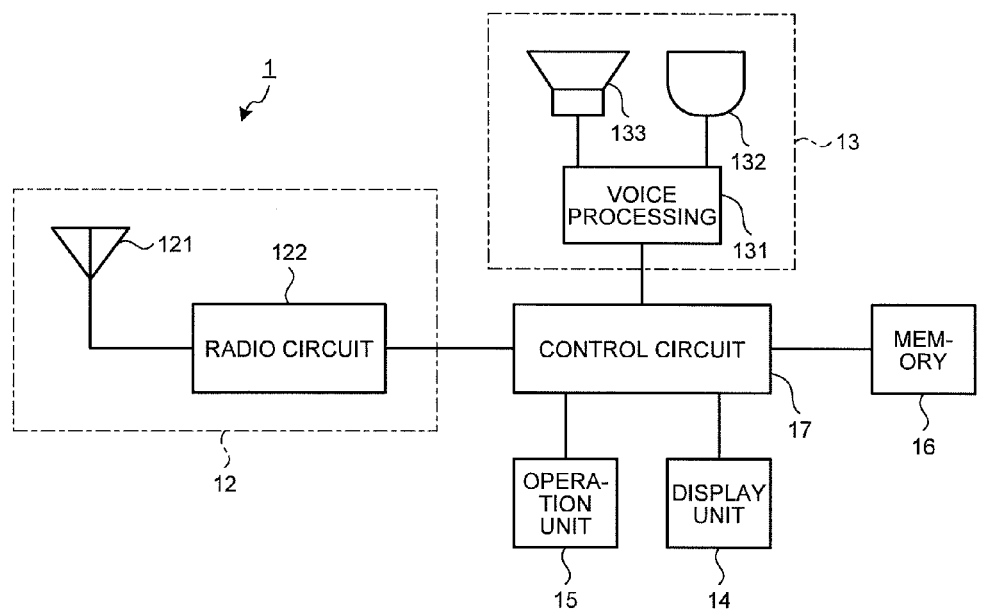
FIG. 2 is a view illustrating an example of a system configuration of a mobile phone according to the first embodiment.

FIGS. 1A and 1B are external views of a mobile phone main body according to a first embodiment. FIG. 1A is an external view in a closed state, and FIG. 1B is an external view in an opened state. FIG. 2 is a block diagram illustrating an example of configuration of main circuits of the mobile phone according to the first embodiment.

As illustrated in FIGS. 1A, 1B and 2, a mobile phone 1 includes a main body case 11, a communication unit 12, a voice processing unit 13, a display unit 14, an operation unit 15 as input means, a memory 16 as a storage unit, a control circuit 17 as a control unit, and a movable mechanism unit 18.

The communication unit 12 is configured with a transmitting and receiving antenna 121 and a radio circuit 122. The transmitting and receiving antenna 121 is accommodated in a main body case 11 at a side where the display unit 14 is located. The radio circuit 122 modulates voice information, ID, browse request information of web page data and the like which are processed by the control circuit 17, and transmits them to a base station (not illustrated) through the antenna 121 to perform radio communication using radio waves. The radio circuit 122 demodulates various information such as page data and voice information wirelessly transmitted from the base station and received through the antenna 121, and outputs it to the control circuit 17.

The voice processing unit 13 including a voice processing circuit 131 is connected with a microphone 132 being an example of an input unit to perform voice input for a voice communication function and a speaker 133 to perform voice outputting. The voice processing circuit 131 performs a predetermined process on voice input from the microphone 132 and supplies it to the control circuit 17. The voice processing circuit 131 has a function of a recognition unit for recognizing voice input from the microphone 132. The voice processing circuit 131 performs a predetermined process on voice information supplied from the control circuit 17, and causes it to be output from the speaker 133.

As illustrated in FIG. 1B, the microphone 132 is arranged at a lower part of the operation unit 15 of the main body case 11, and the speaker 133 is arranged at an upper part of the display unit 14.

As illustrated in FIG. 1B, the display unit 14 includes a display device such as a liquid crystal device (LCD) arranged at an upper part side of the main body case 11, and displays a tag and the like including a telephone number input for the voice communication function, various messages, text data and the like. The uppermost line of the display unit 14 is used as a guide display line to display a mode type, radio-wave strength, remaining battery level and the like.

Especially, the display unit 14 of the first embodiment is capable of displaying a plurality of windows having a certain size as being called as sticky tags (being an example of objects) on a standard screen such that sticky tags are superimposed on a background display of the standard screen based on control of the control circuit 17. The standard screen denotes a screen during non-calling when the mobile phone is powered-up (an idle screen; also called wallpaper, desktop, and a standby screen).

As illustrated in FIG. 1B, the operation unit 15 is arranged at a lower part side of the main body case 11, and is provided with an end (clear)/power key 15a, a start (call) key 15b, a plurality of numerical keys 15c corresponding to numerals and the like, movement keys 15c, a center key 15e, and the like.

The memory 16 is configured to include EEPROM, for example, and stores a control program for calls and transmitting and receiving of mails, internet browser, message data, an address book in which names and telephone numbers are registered, and the like.

Further, sticky tag data corresponding to the respective sticky tags (being an example of object data) is stored in the memory 16. The sticky tag data is configured as being a set of display text data to be displayed in a window, a symbol data, window display position data and the like in addition to link data for the data registered as the sticky tag for each data.

The display text data is text data which is determined according to the predetermined order of priority among text data included in selected data. A user selects a variety of data or a part thereof stored in the memory 16 as the selected data via the operation unit 15. Though, an upper limit is set for text data quantity to be displayed in each window displayed at the display unit 14. Since the upper limit value is eight characters in the first embodiment, upper eight characters of the determined text data is set to the display text data.

The symbol data is an identification symbol set to facilitate identification of a tag property for a user when the sticky tag is displayed on the display unit 14, and is associated with a symbol such as image data, an icon and the like accommodated separately to the symbol data.

The control circuit 17 is configured mainly with a microcomputer, and performs overall control of the mobile phone 1. For example, the control circuit 17 performs control of wireless transmitting and receiving of various information through the communication unit 12, processing of voice information for the voice processing unit 13, display control of information for the display unit 14, processing corresponding to input information of the operation unit 15, access control corresponding to a process to the memory 16, and the like.

The control circuit 17 has a function of a detection unit to detect occurrence of a predetermined event (for example, becoming predetermined time or recognizing a voice of a user). The control circuit 17 has a function of a display control unit to move sticky tags pasted on the standard screen based on the sticky tag data stored in the memory 16 and the occurred predetermined event (for example, becoming predetermined time). That is, the control circuit 17 performs control to move a sticky tag which is not associated with the predetermined event among the plurality of sticky tags displayed on the standard screen to a retirement location of the display unit 14 based on the detected predetermined event and the sticky tag data stored in the memory 16. Details of the control will be described later.

The movable mechanism unit 18 supports one part of the main body case 11 (a side including the display unit 14) and the other part of the main body case 11 (a side including the operation unit 15) as being horizontally rotatable. Accordingly, when the display unit side of the main body case 11 is horizontally rotated from a closed state as illustrated in FIG. 1A, for example, it is possible to be in an opened state as illustrated in FIG. 1B.

Display Control of Sticky Tags Corresponding to Predetermined Event Occurrence

As described above, the plurality of sticky tags are pasted on the standard screen. Since the number of characters to be described on a tag is limited, it is difficult for a user to discriminate the sticky tags in a case that the plurality of sticky tags is pasted on the standard screen. In particular, in a case that a plurality of tags having similar characters exists, a user can recognize only after selecting each tag. As a result, it takes time to perform extracting when a user desires to extract a desired tag among the plurality of tags.

Figure 3:
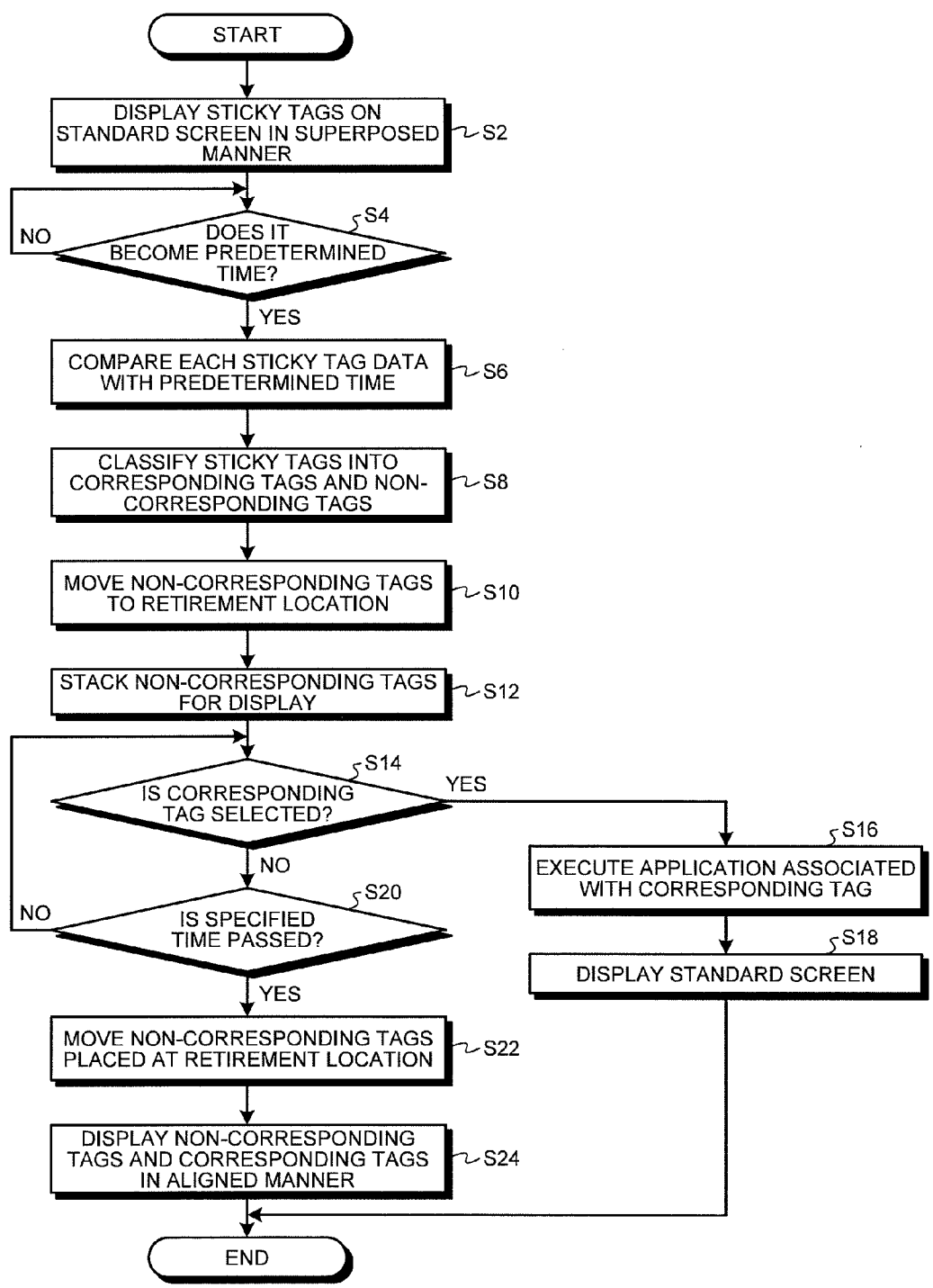
FIG. 3 is a flowchart for describing display control of sticky tags according to the first embodiment.
Figure 4:
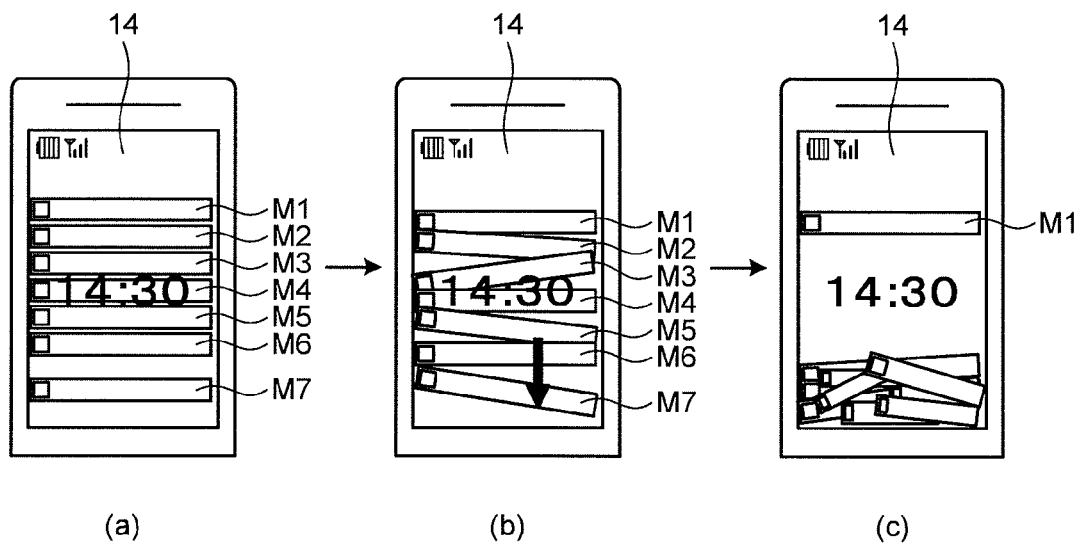
FIG. 4 is a view illustrating an example of state transition of a display unit according to the first embodiment.
Figure 4:
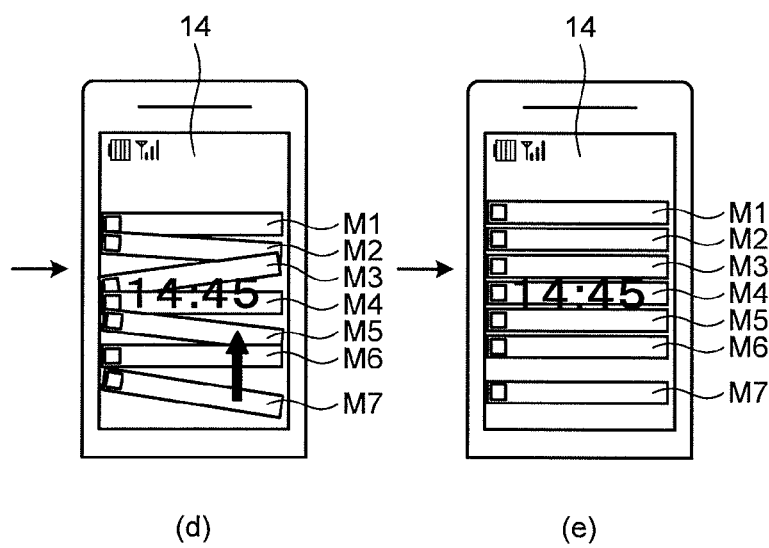

To solve the above problem, display control of the sticky tags is performed as follows. FIG. 3 is a flowchart describing the display control of the sticky tags. FIG. 4 is a state transition diagram of the display unit 14.

The display control described in FIG. 3 starts from a state that the control circuit 17 causes the display unit 14 to display the standard screen (at Step S2). In the first embodiment, as illustrated in FIG. 4(*a*), it is assumed that the plurality (seven pieces) of sticky tags M1 to M7 are to be displayed as being vertically aligned on the standard screen in a superposed manner.

Subsequently, the control circuit 17 determines whether or not the predetermined event occurs (in this case, whether or not it becomes a predetermined time) (at Step S4). Specifically, it is determined whether the time displayed on the standard screen becomes the predetermined time (in this case, the predetermined time is 14:30 as illustrated in FIG. 4(*a*)).

When it becomes the predetermined time (14:30) ("Yes" at Step S4), the control circuit 17 compares the sticky tag data of the respective tags M1 to M7 stored in the memory 16 with the predetermined time (at Step S6). Specifically, the control circuit 17 determines whether or not the respective sticky tag data of the sticky tags M1 to M7 include information of characters associated with 14:30, or information representing presence or absence of an application to be executed in association with 14:30, or the like. For example, it is assumed that the characters of 14:30 are included in the display text data of the sticky tag data of the sticky tag M1.

The control circuit 17 classifies the plurality of sticky tags M1 to M7 displayed on the standard screen into sticky tags associated with the predetermined time (hereinafter, called corresponding tags) and sticky tags unassociated with the predetermined time (hereinafter, called non-corresponding tags) (at Step S8). In the following, it is assumed that the sticky tag M1 corresponds to the corresponding tag and the sticky tags M2 to M7 correspond to the non-corresponding tags. Off course, it is possible to have a plurality of corresponding tags.

Subsequently, as illustrated in FIG. 4(*b*), the control circuit 17 moves the non-corresponding tags M2 to M7 in a direction toward an end part of the display unit 14 (in the direction of an arrow indicated in FIG. 4(*b*)) while maintaining the display position of the corresponding tag M1 on the standard screen (at Step S10). Specifically, the control circuit 17 moves the non-corresponding tags M2 to M7 toward the lower side of the standard screen in an inclined manner not in a horizontal manner. Accordingly, it becomes easy for a user to recognize that the non-corresponding tags M2 to M7 are moving on the standard screen. Off course, the non-corresponding tags M2 to M7 may be horizontally moved.

Subsequently, the control circuit 17 stacks the non-corresponding tags M2 to M7 moved to be arranged at the end part of the display unit 14 (hereinafter, also called the retirement location) for display (at Step S12). At that time, as illustrated in FIG. 4(*c*), the control circuit 17 displays the respective non-corresponding tags M2 to M7 in an inclined manner having lessened size compared to that before being moved. Accordingly, it becomes easy for a user to recognize presence of the non-corresponding tags M2 to M7 at the retirement location being a narrow range.

Subsequently, in a state of FIG. 4(*c*), the control circuit 17 determines whether or not the corresponding tag M1 arranged at a center side of the display unit 14 is selected by a user (at Step S14). In the state of FIG. 4(*c*), although the corresponding tag M1 can be selected by a user, the non-corresponding tags M2 to M7 arranged at the retirement location cannot be selected.

When the corresponding tag M1 is selected ("Yes" at Step S14), the control circuit 17 executes an application associated with the corresponding tag M1 (at Step S16). For example, in a case that a mail composition application is associated with the corresponding tag M1, the control circuit 17 activates the mail composition application when the corresponding tag M1 is selected by a user. Subsequently, when execution of the mail composition application is completed, the control circuit 17 displays the standard screen illustrated in FIG. 4(*a*) (at Step S18) and ends the present control.

On the other hand, when the corresponding tag M1 is not selected ("No" at Step S14), the control circuit 17 determines whether or not a specified time (for example, fifteen minutes) is passed after the non-corresponding tags M2 to M7 are moved toward the retirement location (at Step S20). The specified time can be arbitrarily set by a user and the like. The control circuit 17 repeats the abovementioned processes of Steps S14 to S18 until the specified time is passed ("No" at Step S20).

Then, when the specified time is passed ("Yes" at Step S20), the control circuit 17 moves the non-corresponding tags M2 to M7 arranged at the retirement location in a direction toward the corresponding tag M1 (in a direction of an arrow illustrated in FIG. 4(*d*)) (at Step S22). Specifically, as illustrated in FIG. 4(*d*), the control circuit 17 moves the non-corresponding tags M2 to M7 arranged at the retirement location toward the upper side of the standard screen. Similarly to FIG. 4(*b*), during the movement as well, the control circuit 17 moves the non-corresponding tags M2 to M7 on the standard screen in an inclined manner.

In the above, when the specified time is passed, the non-corresponding tags arranged at the retirement location are to be moved toward the corresponding tag (at Steps S20 and S22 in FIG. 3); however, the control is not limited thereto. For example, it is also possible that the non-corresponding tags arranged at the retirement location are moved toward the corresponding tag when operation of an operational key or the like is performed by a user during the non-corresponding tags are arranged at the retirement location.

Subsequently, the control circuit 17 displays the non-corresponding tags M2 to M7 moved on the standard screen and the corresponding tag M1 in a vertically aligned manner as illustrated in FIG. 4(*e*) (at Step S24). That is, the control circuit 17 displays the standard screen on which the sticky tags M1 to M7 before the non-corresponding tags M2 to M7 are moved at Step S10 are aligned. Thus, the present control is ended.

According to the abovementioned display control, the plurality of sticky tags displayed on the standard screen are classified into the corresponding tags and the non-corresponding tags, and tags having low possibility of being selected by a user are moved while maintaining displaying of tags having high possibility of being selected. Therefore, it is possible to rapidly extract a desired tag for a user.

Another Embodiment of Display Control of Sticky Tags Corresponding to Predetermined Event Occurrence In FIG. 3, it is determined, as the predetermined event occurrence, whether it becomes the predetermined time while the standard screen is displayed (at Step S4). However, the predetermined event is not limited thereto.

For example, it is also possible that the control circuit 17 classifies the sticky tags (at Step S8) when a voice input by a user is recognized. Specifically, the control circuit 17 determines that the predetermined event occurs and classifies the sticky tags in a case that a voice input by the microphone 132 is recognized (more preferably, key operation is performed by a user or inclination of the mobile phone 1 is detected by an acceleration sensor and the like after the voice is recognized).

As a result, displaying of tags corresponding to voice-recognized contents among the sticky tags displayed on the standard screen is maintained and the rest of sticky tags are to be moved to the retirement location. Accordingly, it is possible for a user to rapidly extract a desired tag among the plurality of sticky tags displayed on the standard screen.

In FIG. 4, the display position of the corresponding tag M1 is maintained when the non-corresponding tags M2 to M7 are moved. However, the control is not limited thereto. For example, it is also possible to vary the position of the corresponding tag as illustrated in FIG. 5.

Figure 5:
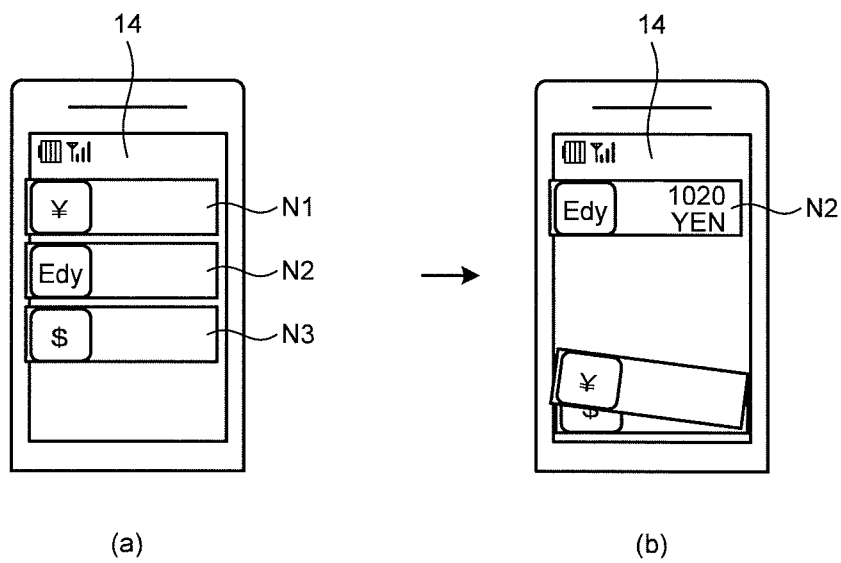
FIG. 5 is a view illustrating another example of the state transition of the display unit according to the first embodiment.
Figure 5:
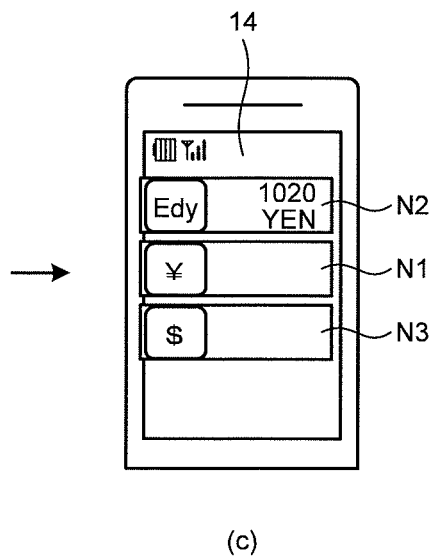

FIG. 5 is a state transition diagram of a display unit according to another embodiment. In FIG. 5, it is assumed that the corresponding tag is a sticky tag N2 and the non-corresponding tags are sticky tags N1 and N3. When the non-corresponding tags N1 and N3 are moved to the retirement location, the corresponding tag N2 is moved to a position of the non-corresponding tag N1 before being moved (FIG. 5(b)).

Subsequently, when the non-corresponding tags N1 and N3 are returned, the moved non-corresponding tags N1 and N3 are arranged below the corresponding tag N2, as illustrated in FIG. 5(c). That is, the control circuit 17 differentiates the alignment order of the sticky tags N1 to N3 after the non-corresponding tags N1 and N3 are returned from the retirement location from the alignment order of the sticky tags N1 to N3 before the non-corresponding tags N1 and N3 are moved to the retirement location.

In this manner, the sticky tags having higher possibility of being selected are arranged at the upper side of the standard screen by varying the alignment order of the sticky tags when the non-corresponding tags are returned from the retirement location. Accordingly, it is possible for a user to rapidly select a desired sticky tag.

Configuration of a Mobile Phone According to a Second Embodiment

Figure 6A:
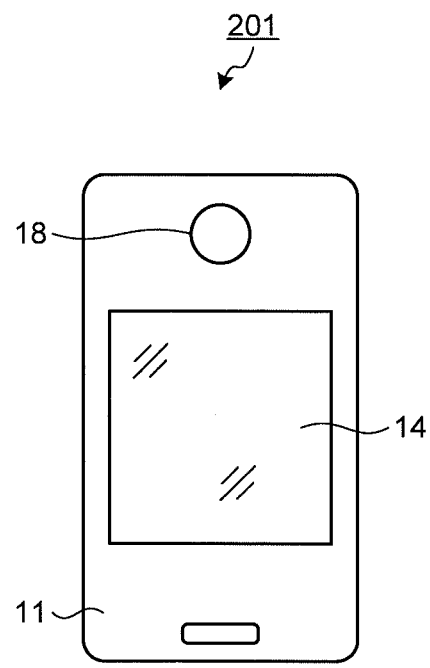
FIG. 6A is a view illustrating an example of an external appearance of a mobile phone in a closed state according to a second embodiment.
Figure 6B:
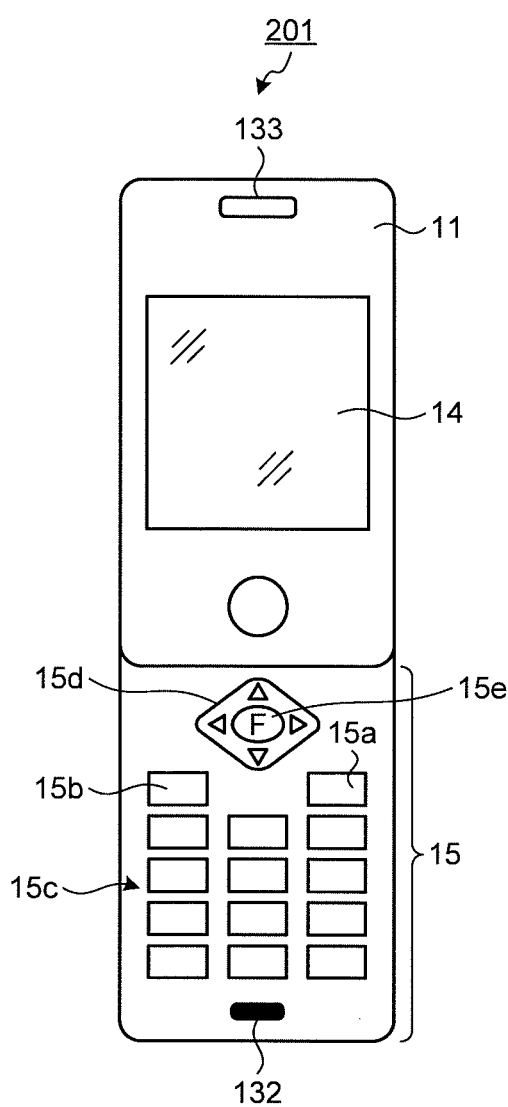
FIG. 6B is a view illustrating an example of an external appearance of the mobile phone in an opened state according to the second embodiment.
Figure 7:
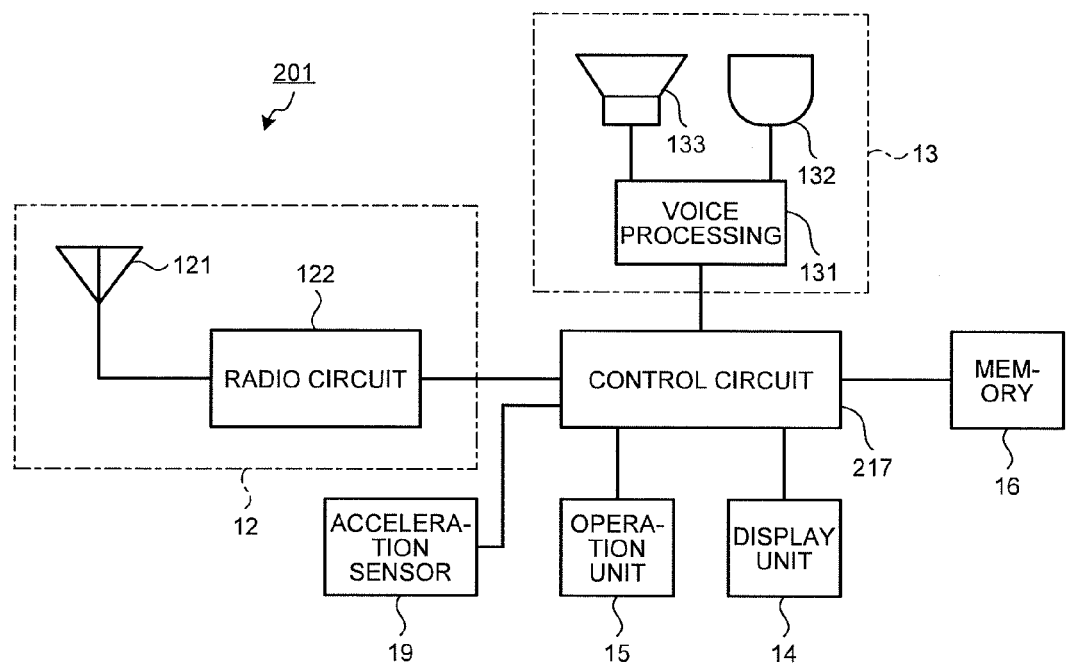
FIG. 7 is a view illustrating an example of a system configuration of the mobile phone according to the second embodiment.

FIGS. 6A and 6B are external views of a mobile phone main body according to a second embodiment. FIG. 6A is an external view in a closed state, and FIG. 6B is an external view in an opened state. FIG. 7 is a block diagram illustrating an example of configuration of main circuits of the mobile phone according to the second embodiment.

As illustrated in FIGS. 6A, 6B and 7, a mobile phone 201 includes the main body case 11, the communication unit 12, the voice processing unit 13, the display unit 14, the operation unit 15, the memory 16 as a storage unit, a control circuit 217 being an example of a control unit, the movable mechanism unit 18, and an acceleration sensor 19 being an example of an inclination detection unit.

Similarly to the display unit 14 of the first embodiment, the display unit 14 of the second embodiment is capable of displaying a plurality of sticky tags on the standard screen such that sticky tags are superimposed on a background display of the standard screen based on control of the control circuit 217.

The control circuit 217 is configured mainly with a microcomputer, and performs overall control of the mobile phone 201. For example, the control circuit 217 performs control of wireless transmitting and receiving of various information through the communication unit 12, processing of voice information for the voice processing unit 13, display control of information for the display unit 14, processing corresponding to input information of the input unit 15, access control corresponding to a process to the memory 16, and the like.

The control circuit 217 has a function of the display control unit to control displaying of the sticky tags pasted on the standard screen. In the second embodiment, the control circuit 217 performs display control of the sticky tags in accordance with inclination of the mobile phone main body. Details of the control will be described later.

The acceleration sensor 19 is for detecting inclination of the mobile phone main body being a device main body.

Display Control of Sticky Tags Corresponding to Inclination of Mobile Phone Main Body As described above, the plurality of sticky tags are pasted on the standard screen. Since the number of characters to be described on a tag is limited, it is difficult for a user to discriminate the sticky tags in a case that the plurality of sticky tags is pasted on the standard screen. In particular, in a case that a plurality of tags having similar characters exists, a user can recognize only after selecting each tag. As a result, it takes time to perform extracting when a user desires to extract a desired tag among the plurality of tags.

Figure 8:
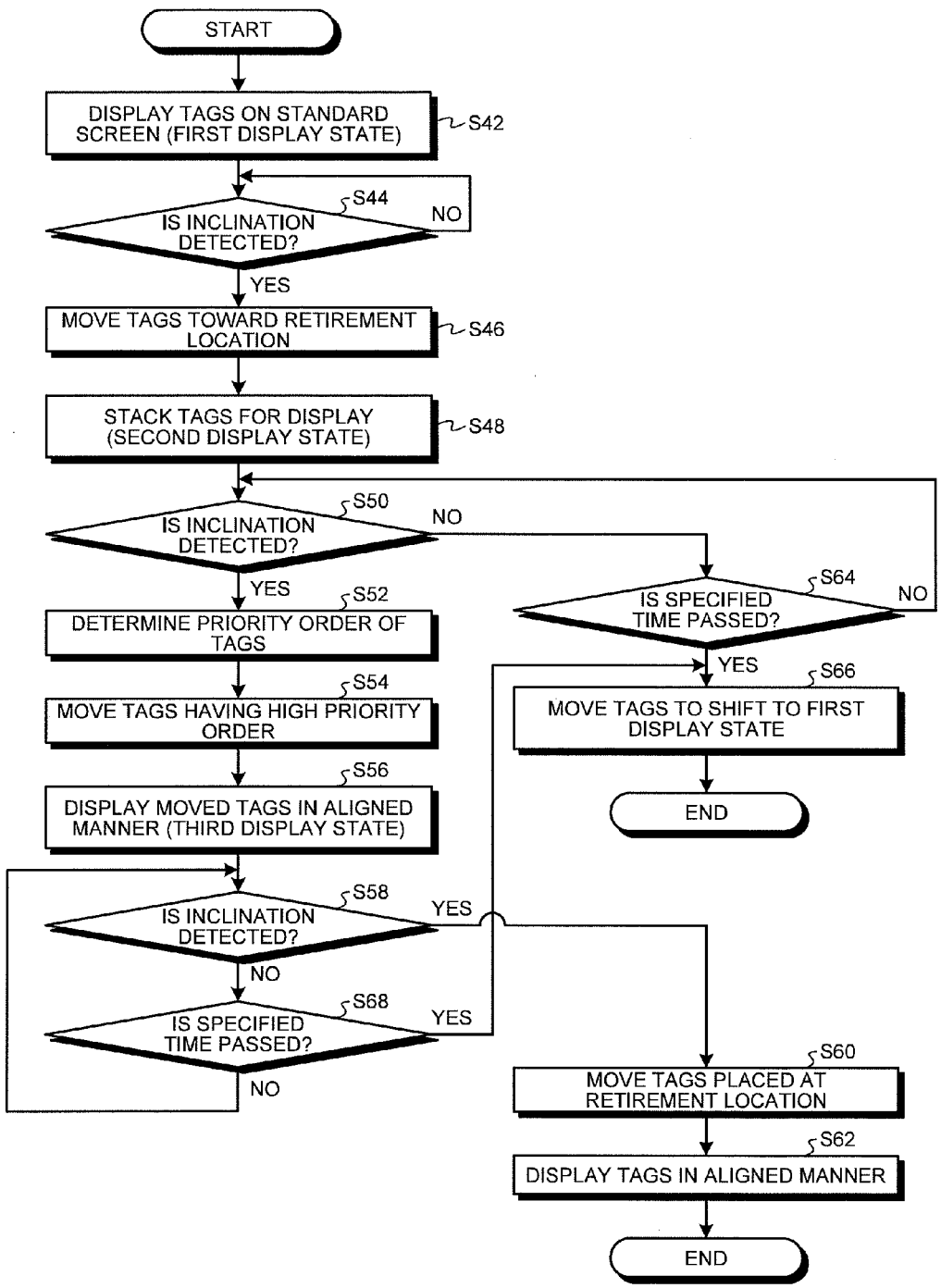
FIG. 8 is a flowchart for describing display control of sticky tags according to the second embodiment.
Figure 9:
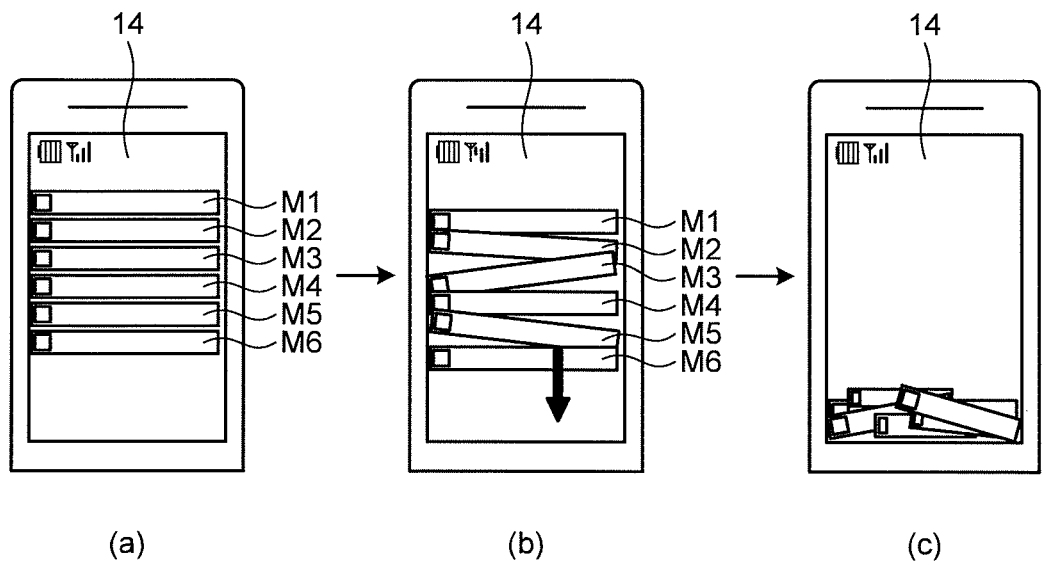
FIG. 9 is a view illustrating an example of state transition of a display unit according to the second embodiment.
Figure 9:
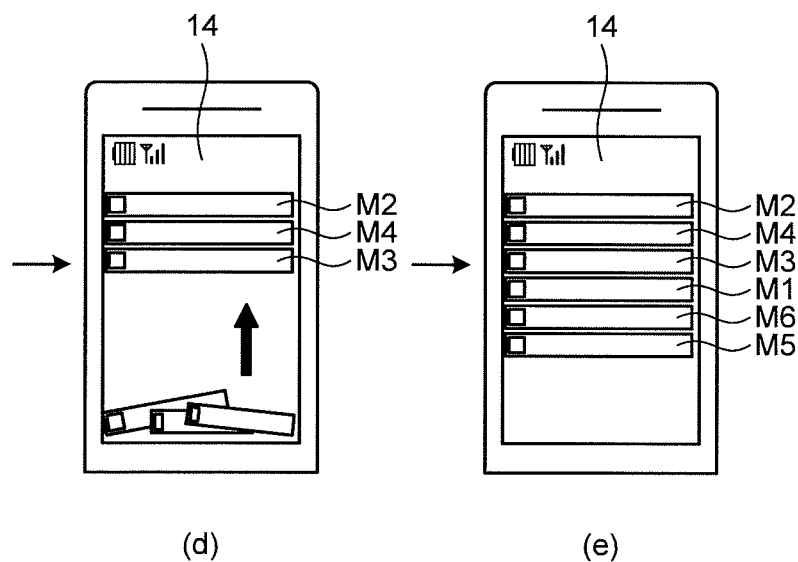

To solve the above problem, the mobile phone 201 of the second embodiment performs display control of the sticky tags in accordance with inclination of the mobile phone main body as described below. FIG. 8 is a flowchart describing the display control of the sticky tags corresponding to inclination of the mobile phone main body. FIG. 9 is a state transition diagram of the display unit 14.

The display control described in FIG. 8 starts from a state that the control circuit 217 causes the display unit 14 to display the standard screen (at Step S42). In the second embodiment, as illustrated in FIG. 9(a), it is assumed that the plurality (six pieces) of sticky tags M1 to M6 are to be displayed as being pasted on the standard screen in a vertically aligned manner (in stacks). The alignment order of the sticky tags M1 to M6 is the order of being created. That is, the sticky tag M1 is firstly created. The display state of the sticky tags illustrated in FIG. 9(a) corresponds to a first display state in which the plurality of sticky tags is displayed in an aligned manner.

Subsequently, the control circuit 217 detects inclination of the mobile phone main body (at Step S44).

Specifically, it is determined whether or not the mobile phone main body is inclined for a predetermined time with the acceleration sensor 19. When inclination of the mobile phone main body is detected ("Yes" at Step S44), the control circuit 217 moves the sticky tags M1 to M6 in a direction toward an end part of the display unit 14 (in the direction of an arrow indicated in FIG. 9(b)) (at Step S46). Specifically, the control circuit 217 moves the sticky tags M1 to M6 toward the lower side of the standard screen in an inclined manner not in a horizontal manner. Accordingly, it becomes easy for a user to recognize that the sticky tags M1 to M6 are moving on the standard screen. Off course, the sticky tags M1 to M6 may be horizontally moved.

Subsequently, the control circuit 217 stacks the sticky tags M1 to M6 moved to be arranged at the end part of the display unit 14 (hereinafter, also called the retirement location) for display (at Step S48). Accordingly, it can be easily recognized that the plurality of sticky tags are temporarily moved. At that time, as illustrated in FIG. 9(c), the control circuit 217 displays the sticky tags M1 to M6 in an inclined manner having lessened size compared to that before being moved. Accordingly, it becomes easy for a user to recognize presence of the sticky tags M1 to M6 at the retirement location being a narrow range. The display state of the sticky tags illustrated in FIG. 9(c) corresponds to a second display state in which the plurality of sticky tags is not displayed in an aligned manner.

When inclination of the mobile phone main body is detected with the acceleration sensor 19 ("Yes" at Step S50) in the second display state, the control circuit 217 determines priority order of the sticky tags (at Step S52). The priority order is determined as follows. For example, the priority order becomes high with increase of selection frequency (the click number) of the sticky tag. Alternatively, the priority order becomes high with correspondence of the sticky tag to the current time. In this case, it is assumed that the sticky tags M2, M3 and M4 are tags having high priority order and the sticky tags M1, M5 and M6 are tags having low priority order. Information of the selection frequency and the like is stored in the memory 16.

Then, the control circuit 217 moves the sticky tags M2, M3 and M4 having high priority order to the center side of the display unit 14 on the standard screen (at Step S54) while maintaining the display position (retirement location) of the sticky tags M1, M5 and M6 having low priority order. In this case, three pieces of the sticky tags M1, M5 and M6 are selected and moved among six pieces of sticky tags. However, not limited to this, it is also possible that one sticky tag is selected and moved.

Subsequently, the control circuit 217 displays the sticky tags M2, M3 and M4 on the standard screen in a vertically aligned manner as illustrated in FIG. 9(d) (at Step S56). That is, the sticky tags are divided into two groups in accordance with the priority order. It becomes easy for a user to select a desired sticky tag by aligning the sticky tags M2, M3 and M4 having high possibility to be selected as described above. The display state of the sticky tags M2, M3 and M4 illustrated in FIG. 9(d) corresponds to a third display state.

As illustrated in FIG. 9(d), the alignment order of the sticky tags M2, M3 and M4 is different from the alignment order in FIG. 9(a). Specifically, the sticky tags M3 and M4 are replaced in order. This is because the priority order of the sticky tag M4 is higher than that of the sticky tag M3. The priority order of the sticky tag M2 is higher than that of the sticky tag M3. In this manner, since the sticky tags are aligned in the decreasing priority order, it becomes easier for a user to select a desired sticky tag.

When inclination of the mobile phone main body is detected with the acceleration sensor 19 ("Yes" at Step S58) in the third display state, the control circuit 217 moves the sticky tags M1, M5 and M6 arranged at the retirement location to the center side of the display unit on the standard screen (at Step S60). Then, as illustrated in FIG. 9(e), the control circuit 217 displays the sticky tags M1 to M6 as aligning in decreasing priority order (at Step S62). That is, the alignment order of the sticky tags illustrated in FIG. 9(e) is different from the alignment order of the sticky tags illustrated in FIG. 9(a).

While being displayed in the first display state or the third display state, the vertically aligned sticky tags can be selected by a user with a key of the operation unit 15. When the sticky tag is selected, the control circuit 217 executes an application which is associated with the sticky tag. For example, in a case that the sticky tag M2 is associated with a mail composition application, the control circuit 217 activates the mail composition application when the sticky tag M2 is selected in the third display state. Subsequently, when execution of the mail composition application is completed, the control circuit 217 switches the displaying into the third display state.

When inclination of the mobile phone main body is not detected at Step S50 described above ("No" at Step S50) and a specified time is passed after shifting into the second display state ("Yes" at Step S64), the control circuit 217 moves the sticky tags M1 to M6 arranged at the retirement location to the center side of the display unit 14 and displays the sticky tags M1 to M6 as illustrated in FIG. 9(a) (at Step S66). That is, the control circuit 217 performs shift from the second display state to the first display state.

Similarly, when inclination of the mobile phone main body is not detected at Step S58 ("No" at Step S58) and a specified time is passed after shifting into the third display state ("Yes" at Step S68), the control circuit 217 moves the sticky tags M1, M5 and M6 arranged at the retirement location to the center side of the display unit and displays the sticky tags M1 to M6 as illustrated in FIG. 9(a) (at Step S66). That is, the control circuit 217 performs shift of sticky tag display from the third display state to the first display state.

In the abovementioned display control, the control circuit 217 selects and moves the sticky tags M2, M3 and M4 among the sticky tags M1 to M6 in the second display state to shift to the third display state in which the moved sticky tags M2, M3 and M4 are displayed in an aligned manner. Accordingly, the sticky tags having high priority order are moved and aligned in a state that the sticky tags having low priority order are arranged at the retirement location among the plurality of sticky tags displayed on the standard screen, so that a desired tag can be rapidly extracted by a user.

In the abovementioned display control, alignment of objects on the standard screen is varied with detection of inclination of the mobile phone main body as a trigger; however, it is also possible to vary alignment of objects on the standard screen having a trigger with another predetermined event such as becoming predetermined time, recognizing a voice, and depressing of a predetermined key of the operation unit 15.

Other Embodiments

The embodiments of the mobile phone and the like are described above. The respective embodiments are intended to facilitate understanding of the present invention and shall not be construed as limiting the present invention. Off course, the present invention may be varied and modified without departing from spirit thereof and the present invention includes equivalents thereof. In particular, embodiments described in the following are included in the present invention.

It is also possible to configure a mobile electronic device by appropriately combining the configuration of the mobile electronic device described in the first embodiment and the configuration of the mobile electronic device described in the second embodiment. Further, it is also possible to perform a display controlling method by appropriately combining the display controlling method described in the first embodiment and the display controlling method described in the second embodiment.

In the abovementioned embodiments, the mobile phone 1 and the mobile phone 201 are described as the mobile electronic device; however, the mobile electronic device is not limited thereto. The mobile electronic device may be a PHS (Registered trademark: Personal Handy Phone System), a PDA (Personal Digital Assistant), a portable navigation device, an electronic dictionary, a notebook computer, or the like.

In the abovementioned embodiments, the mobile phone 1 and the mobile phone 201 have the configuration of horizontal rotating as illustrated in FIGS. 1A and 1B or FIGS. 6A and 6B; however, the configuration is not limited thereto. For example, the mobile phone 1 and the mobile phone 201 may be a mobile phone of a straight type or a flip type, a mobile phone of a folding type, a mobile phone with slide motion, or the like.

In the abovementioned embodiments, the sticky tags arranged at the retirement location are displayed (FIGS. 4(*c*) and 9(C)); however, it is not limited thereto. For example, it is also possible that the sticky tags arranged at the retirement location are not to be displayed. Off course, thereafter, the non-corresponding tags are to be displayed when being moved toward the center side.

In the abovementioned embodiments, the objects to be displayed on the standard screen are described using an example of the sticky tags; however, the objects to be displayed on the standard screen are not limited thereto. For example, the objects may be icons, files and the like.

Figure 10:
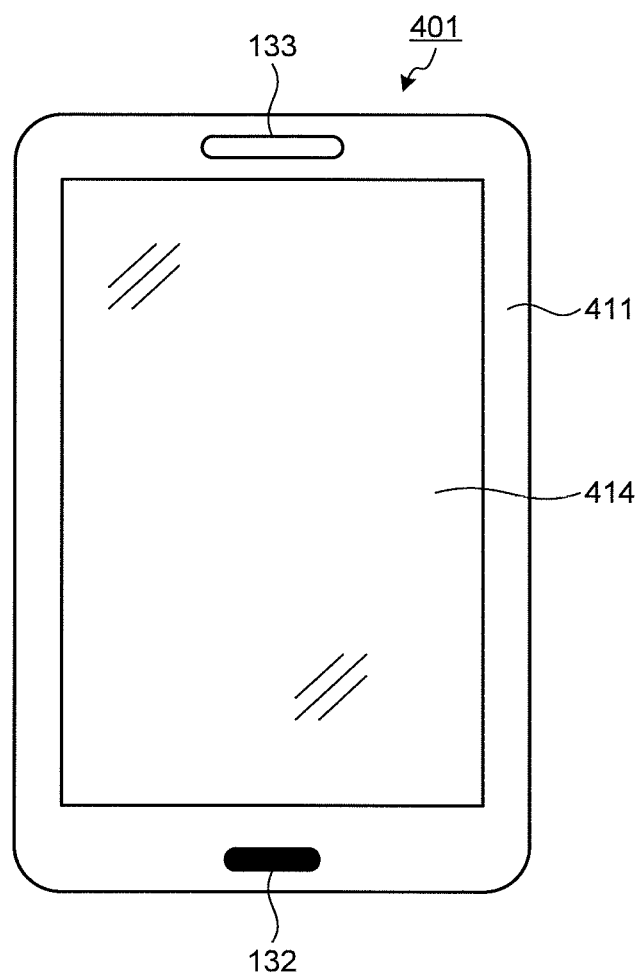
FIG. 10 is a view illustrating an example of an external appearance of a mobile phone which displays icons on a standard screen.
Figure 11:
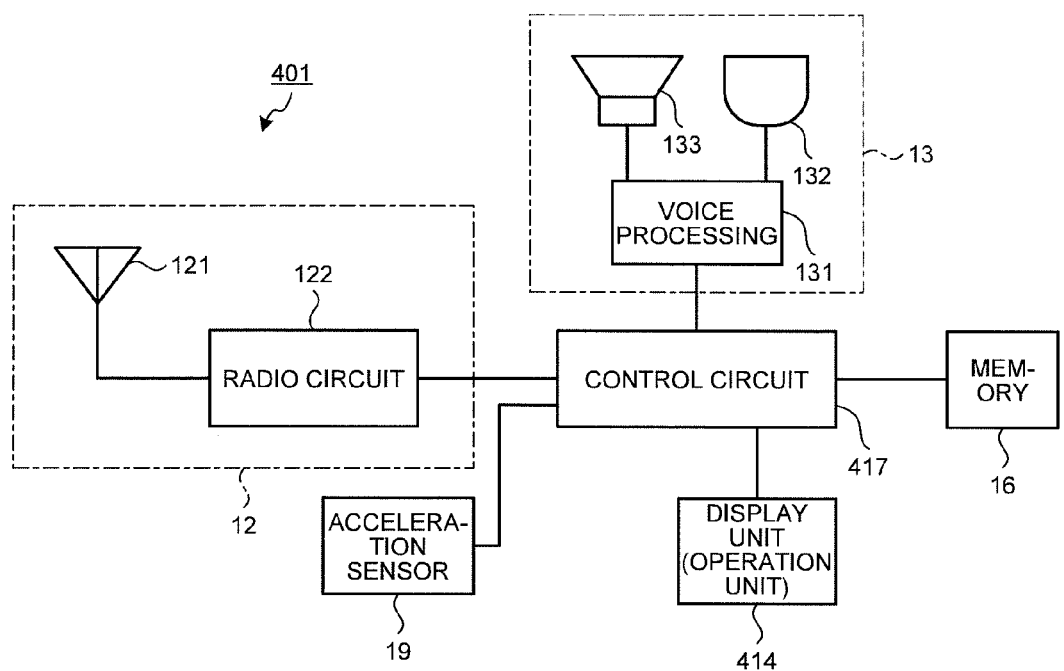
FIG. 11 is a view illustrating an example of a system configuration of the mobile phone illustrated in FIG. 10.
Figure 12:
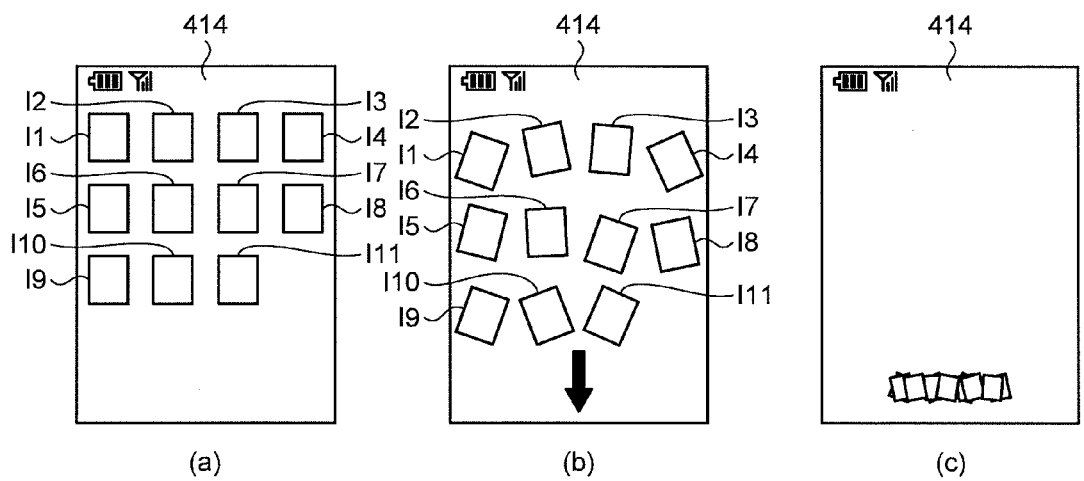
FIG. 12 is a view illustrating an example of state transition of a display unit of the mobile phone illustrated in FIG. 10.
Figure 12:
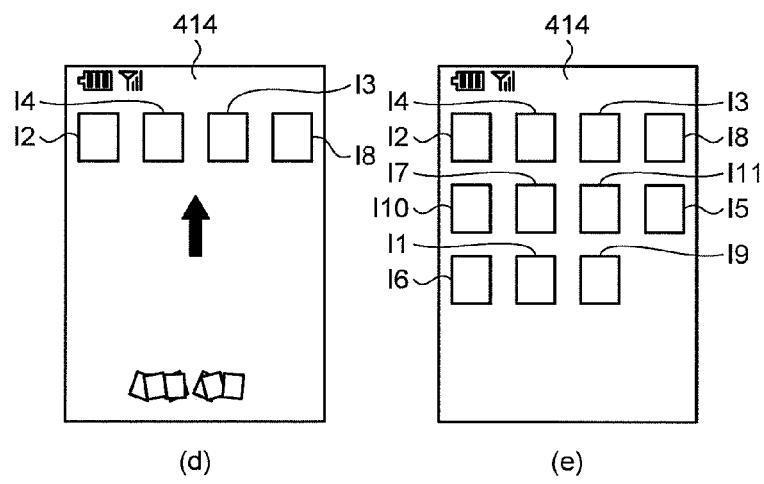

An example of display control of icons displayed on the standard screen will be described with reference to FIGS. 10 to 12. FIG. 10 is an external view of a mobile phone having icons displayed on the standard screen. FIG. 11 is a block diagram illustrating a structural example of main circuits of the mobile phone illustrated in FIG. 10. FIG. 12 is a state transition diagram of a display unit of the mobile phone illustrated in FIG. 10.

As illustrated in FIGS. 10 and 11, a mobile phone 401 includes a main body case 411, the communication unit 12, the voice processing unit 13, a display unit 414, the memory 16, a control circuit 417 as a control unit, and the acceleration sensor 19.

As illustrated in FIG. 10, the display unit 414 includes a display device such as a liquid crystal display device (LCD) and the like exposed to the outside of the case main body 411, and displays a telephone number and a variety of messages input for a communication function and a variety of icons. A touch sensor such as a capacitive type and a pressure-sensitive type to detect contact of a finger and the like is superimposed to the display device included in the display unit 414. That is, the display unit 414 functions also as an operation unit as the touch sensor detects operation performed by a user with a finger and the like against a surface of the display unit 414.

The display unit 414 is capable of displaying a plurality of icons (an example of objects) on the standard screen so as to be superimposed on a background display of the standard screen based on control of the control circuit 417. The icons to be displayed on the standard screen are associated respectively with specific applications or data. When tapping (clicking) against an icon is detected by the display unit 414, the control circuit 417 performs activation of an application associated with the icon or execution of a process using data associated with the icon (for example, displaying of associated image data).

The control circuit 417 is configured mainly with a microcomputer, and performs overall control of the mobile phone 401. For example, the control circuit 417 performs control of wireless transmitting and receiving of various information through the communication unit 12, processing of voice information for the voice processing unit 13, display control of information for the display unit 414, processing corresponding to operation detected by the display unit 414, access control corresponding to a process to the memory 16, and the like. The control circuit 417 includes a function of the display control unit to control displaying of icons aligned on the standard screen.

For example, as illustrated in FIG. 12(*a*), it is assumed that the plurality (eleven pieces) of icons I1 to I11 are superimposed and displayed on the standard screen as being aligned at equal intervals. In this case, the alignment order of the icons I1 to I11 is the order of being created. Specifically, the firstly-created icon I1 is displayed at the upper left and the secondary-created icon I2 is displayed at the immediate right thereof. An icon created in the third or later is arranged to the immediate right of the last previously-created icon when sufficient room exists thereat, and is arranged to the left end on the next line when sufficient room does not exist at the immediate right thereof. A display state of the icons illustrated in FIG. 12(*a*) corresponds to the first display state in which the plurality of icons is displayed in an aligned manner. The icons may be previously created like a default menu screen of a mobile phone.

When inclination of the mobile phone main body is detected, the control circuit 417 moves the icons I1 to I11 in a direction toward an end part of the display unit 414 (in the direction of an arrow illustrated in FIG. 12(*b*)), as illustrated in FIG. 12(*b*). Specifically, the control circuit 417 moves the icons I1 to I11 toward the lower side of the standard screen in an inclined manner not in a horizontal manner. Accordingly, it becomes easy for a user to recognize that the icons I1 to I11 are moving on the standard screen. Off course, the icons I1 to I11 may be horizontally moved.

Subsequently, as illustrated in FIG. 12(*c*), the control circuit 417 stacks the icons I1 to I11 moved to be arranged at the end part of the display unit 414 (hereinafter, also called the retirement location) for display. Accordingly, it can be easily recognized that the plurality of icons are temporarily moved. At that time, the control circuit 417 displays the icons I1 to I11 in an inclined manner having lessened size compared to that before being moved. Accordingly, it becomes easy for a user to recognize presence of the icons I1 to I11 at the retirement location being a narrow range. The display state of the icons illustrated in FIG. 12(*c*) corresponds to the second display state in which the plurality of icons is not displayed in an aligned manner.

When inclination of the mobile phone main body is detected with the acceleration sensor 19 in the second display state, the control circuit 417 determines priority order of the icons. The priority order is determined as follows. For example, the priority order becomes high with increase of selection frequency (the tap number) of the icon. Alternatively, the icon which is lastly selected (tapped) has higher priority order. In this case, it is assumed that the icons I2, I3, I4 and I8 are icons having high priority order and the rest of icons are icons having low priority order. Further, it is assumed that the priority order of the icons I2, I3, I4 and I8 is in the decreasing order of the icons I2, I4, I3 and I8. Information of the selection frequency and the like is stored in the memory 16.

The control circuit 417 moves the icons I2, I3, I4 and I8 having high priority order to the center side of the display unit 414 on the standard screen while maintaining the display position (retirement location) of the icons having low priority order. In this case, the four icons among the eleven icons are selected and moved. However, not limited thereto, it is also possible that one icon is selected and moved.

Subsequently, the control circuit 417 displays the icons I2, I3, I4 and I8 on the standard screen as illustrated in FIG. 12(*d*). That is, the icons are divided into two groups in accordance with the priority order. It becomes easy for a user to select a desired icon by aligning the icons I2, I3, I4 and I8 having high possibility to be selected as described above. The display state of the icons I2, I3, I4 and I8 illustrated in FIG. 12(d) corresponds to the third display state.

As illustrated in FIG. 12(d), the alignment order of the icons I2, I3, I4 and I8 is different from the alignment order in FIG. 12(a). Specifically, the icons I3 and I4 are replaced in order. This is because the priority order of the icon I4 is higher than that of the icon I3. In this manner, since the icons are aligned in the decreasing priority order, it becomes easier for a user to select a desired icon.

When inclination of the mobile phone main body is detected with the acceleration sensor 19 in the third display state, the control circuit 417 moves the icons I1, I5 to I7, and I9 to I11 arranged at the retirement location to the center side of the display unit 414 on the standard screen. Then, as illustrated in FIG. 12(e), the control circuit 417 displays the icons I1 to I11 as aligning in decreasing priority order. That is, the alignment order of the icons illustrated in FIG. 12(e) is different from the alignment order of the icons illustrated in FIG. 12(a).

While being displayed in the first display state or the third display state, the aligned icons can be selected by a user with tapping on the display unit 414. When the icon is selected, the control circuit 417 executes the activation of an application which is associated with the icon or the like. For example, in a case that the icon I2 is associated with a mail composition application, the control circuit 417 activates the mail composition application when the icon I2 is selected in the third display state. Subsequently, when execution of the mail composition application is completed, the control circuit 417 switches the displaying into the third display state.

When inclination of the mobile phone main body is not detected and a specified time is passed after shifting into the second display state, the control circuit 417 moves the icons I1 to I11 arranged at the retirement location to the center side of the display unit 141 and displays the icons I1 to I11 as illustrated in FIG. 12(a). That is, the control circuit 417 performs shift from the second display state to the first display state.

Similarly, when inclination of the mobile phone main body is not detected and a specified time is passed after shifting into the third display state, the control circuit 417 moves the icons I1, I5 to I7 and I9 to I11 arranged at the retirement location to the center side of the display unit 414 and displays the icons I1 to I11 as illustrated in FIG. 12(a). That is, the control circuit 417 performs shift of icon display from the third display state to the first display state.

In the abovementioned display control, the control circuit 417 selects and moves the icons I2, I3, I4 and I8 among the icons I1 to I11 in the second display state, and performs shift to the third display state in which the moved icons I2, I3, I4 and I8 are displayed in an aligned manner. Accordingly, the icons having high priority order are moved and aligned in a state that the icons having low priority order are arranged at the retirement location among the plurality of icons displayed on the standard screen, so that a desired icon can be rapidly selected by a user.

The invention claimed is:

1. A mobile electronic device, comprising:
   a display unit for displaying a standard screen on which objects are superimposed;
   a detection unit for detecting occurrence of a predetermined event; and
   a display control unit for changing arrangement of the objects displayed on the display unit in accordance with the predetermined event detected by the detection unit,
   wherein the display control unit shifts a display state of the objects in accordance with the predetermined event detected by the detection unit to any of a first display state in which the objects are displayed in an aligned manner, a second display state in which the objects are not displayed in an aligned manner, and a third display state in which a part of objects among the objects is displayed in an aligned manner and other objects are not displayed in an aligned manner,
   wherein the mobile electronic device further comprises a storage unit for storing information regarding a selection frequency for each of the objects, and
   wherein the display control unit
      displays an object which has the selection frequency at or higher than a predetermined value as the part of objects in the third display state, and
      displays objects which have the selection frequencies lower than the predetermined value as the other objects.

2. The mobile electronic device according to claim 1, wherein
   after shifting the display state to the second display state by moving all of the objects displayed in the first display state to the end part of the display unit, the display control unit shifts the display state to the third display state by
      moving the part of objects among the objects displayed in the second display state, and
      displaying the moved part of objects in an aligned manner.

3. The mobile electronic device according to claim 1, wherein
   the objects displayed in an aligned manner in the first display state and the third display state are displayed at a center part of the display unit.

4. The mobile electronic device according to claim 2, wherein
   the display control unit differentiates alignment order of the objects aligned in the third display state from alignment order of the objects aligned in the first display state.

5. A mobile electronic device, comprising:
   a display unit for displaying a standard screen on which objects are superimposed;
   a detection unit for detecting occurrence of a predetermined event; and
   a display control unit for changing arrangement of the objects displayed on the display unit in accordance with the predetermined event detected by the detection unit,
   wherein the display control unit shifts a display state of the objects in accordance with the predetermined event detected by the detection unit to any of a first display state in which the objects are displayed in an aligned manner, a second display state in which the objects are not displayed in an aligned manner, and a third display state in which a part of objects among the objects is displayed in an aligned manner and other objects are not displayed in an aligned manner,
   wherein the detection unit detects inclination of the mobile electronic device as occurrence of the predetermined event; and
   the display control unit shifts the display state among the first display state, the second display state, and the third display state when the inclination is detected by the detection unit.

6. The mobile electronic device according to claim 5, wherein
   after shifting the display state to the second display state by moving all of the objects displayed in the first display state to the end part of the display unit, the display control unit shifts the display state to the third display state by moving the part of objects among the objects displayed in the second display state, and displaying the moved part of objects in an aligned manner.

7. The mobile electronic device according to claim 5, wherein the objects displayed in an aligned manner in the first display state and the third display state are displayed at a center part of the display unit.

8. The mobile electronic device according to claim 6, wherein the display control unit differentiates alignment order of the objects aligned in the third display state from alignment order of the objects aligned in the first display state.

9. A display controlling method for a mobile electronic device which includes a display unit, the display controlling method comprising:

displaying a standard screen on which objects are superimposed on the display unit;

detecting occurrence of a predetermined event; and changing arrangement of the objects displayed on the display unit in accordance with the detected predetermined event, wherein said changing comprises shifting a display state of the objects in accordance with the detected predetermined event to any of a first display state in which the objects are displayed in an aligned manner, a second display state in which the objects are not displayed in an aligned manner, and a third display state in which a part of objects among the objects is displayed in an aligned manner and other objects are not displayed in an aligned manner, storing information regarding a selection frequency for each of the objects, displaying an object which has the selection frequency at or higher than a predetermined value as the part of objects in the third display state, and displaying objects which have the selection frequencies lower than the predetermined value as the other objects.

10. A display controlling method for a mobile electronic device which includes a display unit, the display controlling method comprising:

displaying a standard screen on which objects are superimposed on the display unit;

detecting occurrence of a predetermined event; and changing arrangement of the objects displayed on the display unit in accordance with the detected predetermined event, wherein said changing comprises shifting a display state of the objects in accordance with the detected predetermined event to any of a first display state in which the objects are displayed in an aligned manner, a second display state in which the objects are not displayed in an aligned manner, and a third display state in which a part of objects among the objects is displayed in an aligned manner and other objects are not displayed in an aligned manner, wherein the predetermined event includes inclination of the mobile electronic device, and wherein said shifting comprises shifting the display state among the first display state, the second display state, and the third display state when inclination of the mobile electronic device is detected.

* * * * *